United States Patent
Ruvini et al.

(10) Patent No.: US 10,552,548 B2
(45) Date of Patent: Feb. 4, 2020

(54) METHODS FOR AUTOMATIC GENERATION OF PARALLEL CORPORA

(71) Applicant: PayPal, Inc., San Jose, CA (US)

(72) Inventors: Jean-David Ruvini, Los Gatos, CA (US); Hassan Sawaf, Los Gatos, CA (US); Derek Barnes, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 15/884,336

(22) Filed: Jan. 30, 2018

(65) Prior Publication Data

US 2018/0253421 A1   Sep. 6, 2018

Related U.S. Application Data

(63) Continuation of application No. 14/587,552, filed on Dec. 31, 2014, now Pat. No. 9,881,006.

(60) Provisional application No. 61/946,640, filed on Feb. 28, 2014.

(51) Int. Cl.
*G06F 17/28* (2006.01)
*G06Q 30/06* (2012.01)

(52) U.S. Cl.
CPC ........ *G06F 17/289* (2013.01); *G06F 17/2827* (2013.01); *G06Q 30/0601* (2013.01); *G06F 17/28* (2013.01); *G06F 17/2809* (2013.01); *G06F 17/2818* (2013.01); *G06F 17/2845* (2013.01)

(58) Field of Classification Search
None
See application file for complete search history.

(56) References Cited

U.S. PATENT DOCUMENTS

| | | | | |
|---|---|---|---|---|
| 5,751,957 | A * | 5/1998 | Hiroya | G06F 17/2872 709/203 |
| 9,342,503 | B1 * | 5/2016 | Evans | G06F 9/454 |
| 2003/0154071 | A1 * | 8/2003 | Shreve | G06F 17/2845 704/9 |
| 2003/0204400 | A1 * | 10/2003 | Marcu | G06F 17/2735 704/251 |

(Continued)

OTHER PUBLICATIONS

Daneil Gildea, "Loosely Tree-based alginment for machine translation", In Proceeedings of ACL 2003, 2003.*

*Primary Examiner* — Richard Z Zhu
(74) *Attorney, Agent, or Firm* — Maschoff Brennan

(57) ABSTRACT

A method of forming parallel corpora comprises receiving sets of items in first language and second languages, each of the sets having one or more associated descriptions and metadata. The metadata is collected from the two sets of items and are aligned using the metadata. The aligned metadata are mapped from the first language to the second language for each of the sets. The descriptions of two items are fetched and the structural similarity of the descriptions is measured to assess whether two items are likely to be translations of each other. For mapped items with structurally similar descriptions, the mapped item descriptions are formed into respective sentences in first language and in the second language. The sentences are parallel corpora which may be used to translate an item from the first language to the second language, and also to train a machine translation system.

20 Claims, 8 Drawing Sheets

(56) References Cited

U.S. PATENT DOCUMENTS

| | | | |
|---|---|---|---|
| 2004/0158799 A1* | 8/2004 | Breuel | G06F 17/30914 715/212 |
| 2007/0033001 A1* | 2/2007 | Muslea | G06F 17/2827 704/3 |
| 2007/0061129 A1* | 3/2007 | Barreiro | G06F 17/289 704/9 |
| 2008/0040095 A1* | 2/2008 | Sinha | G06F 17/2827 704/2 |
| 2008/0275691 A1* | 11/2008 | Summerlin | G06F 17/2735 704/8 |
| 2010/0299132 A1* | 11/2010 | Dolan | G06F 17/2818 704/2 |
| 2012/0150531 A1* | 6/2012 | Bangalore | G06F 17/28 704/9 |
| 2012/0239378 A1* | 9/2012 | Parfentieva | G06F 17/2785 704/4 |
| 2014/0067361 A1* | 3/2014 | Nikoulina | G06F 17/2818 704/2 |
| 2015/0248401 A1* | 9/2015 | Ruvini | G06F 17/289 704/2 |

\* cited by examiner

| | 302 | |
|---|---|---|
| SPANISH | 186 2212122239103 ZAPATILLAS CONVERSE CT CLEAN CVO OX PIEL GRIS CARBON HOMBRE TALLA EU 46.5 |
| ENGLISH | 3 3210956610465 CONVERSE CT CLEAN CVO OX LEATHER MENS SHOES CHARCOAL SIZE 1 15709 0022861486496 |

| | 304 | |
|---|---|---|
| SPANISH | 186 3508288668551 GEL REFRESCANTE ANTISTAX PIERNAS 125ml x 4.0 |
| ENGLISH | 2309936201987 ANTISTAX COOLING LEG GEL 125ml x 4 POSTAGE 11862 5012911709785 |

| | 306 | |
|---|---|---|
| SPANISH | 186 121087506976 PAPEL DECORACION PARED PANEL MADERA CHOCOLATE FD31055 |
| ENGLISH | 15 121087430379 CHOCOLATE BROWN -- FD31055 -- WOOD PANEL -- FINE DÉCOR WALLPAPER 42135 5011419310555 |

*FIG. 3*

METHODS FOR AUTOMATIC GENERATION OF PARALLEL CORPORA

CROSS-REFERENCE TO RELATED APPLICATIONS

This application is a continuation of U.S. patent application Ser. No. 14/587,552, filed on Dec. 31, 2014, now U.S. Pat. No. 9,881,006, issued on Jan. 30, 2018; which claims the benefit of U.S. patent application Ser. No. 61/946,640, filed on Feb. 28, 2014; the disclosures of all of these applications and patents are incorporated by reference herein.

TECHNICAL FIELD

The present application relates generally to electronic commerce and, in one specific example, to techniques for translating text for ecommerce transactions.

BACKGROUND OF THE INVENTION

The use of mobile devices, such as cellphones, smartphones, tablets, and laptop computers, has increased rapidly in recent years, which, along with the rise in dominance of the Internet as the primary mechanism for communication, has caused an explosion in electronic commerce ("ecommerce"). As these factors spread throughout the world, communications between users that utilize different spoken or written languages increase exponentially. Ecommerce has unique challenges when dealing with differing languages being used, specifically an ecommerce transaction often involves the need to ensure specific information is accurate. For example, if a potential buyer asks a seller about some aspect of a product for sale, the answer should be precise and accurate. Any failing in the accuracy of the answer could result in a lost sale or an unhappy purchaser.

BRIEF DESCRIPTION OF THE DRAWINGS

Some embodiments are illustrated by way of example and not limitation in the figures of the accompanying drawings in which:

FIG. 3 is a diagram illustrating Spanish language items mapped to English language items in accordance with an example embodiment.

DETAILED DESCRIPTION

Example methods and systems for machine translation are provided. It will be evident, however, to one skilled in the art that the present inventive subject matter may be practiced without these specific details.

According to various exemplary embodiments, context information about past purchases, communications, or other known information surrounding parties to a potential ecommerce transaction are used to improve translation of text related to the potential ecommerce transaction.

Figure 1:
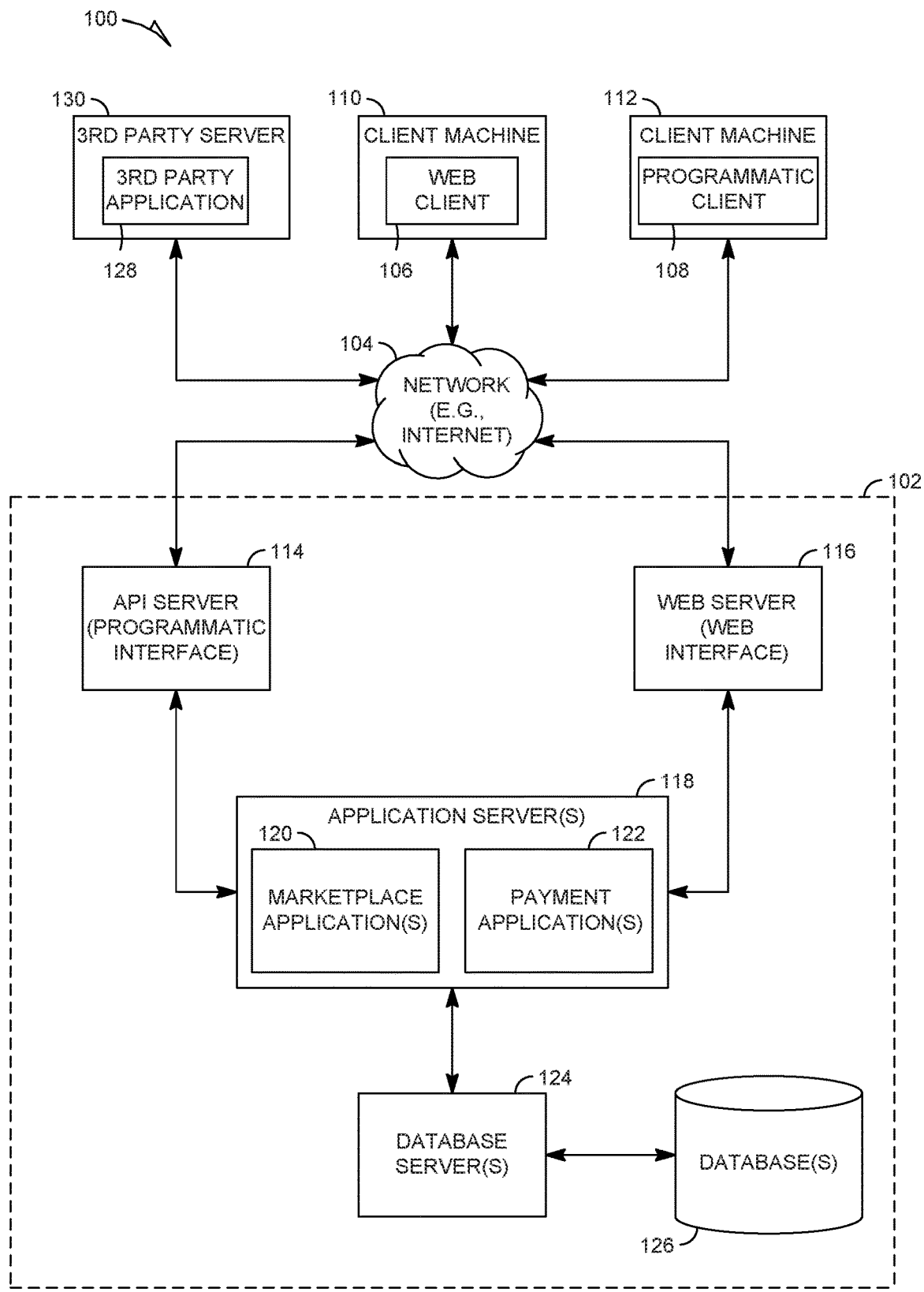
FIG. 1 is a network diagram depicting a client-server system, within which one example embodiment may be deployed.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or a Wide Area Network (WAN)), to one or more clients. FIG. 1 illustrates, for example, a web client 106 (e.g., a browser, such as the Internet Explorer browser developed by Microsoft Corporation of Redmond, Wash. State) and a programmatic client 108 executing on respective devices 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course, not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
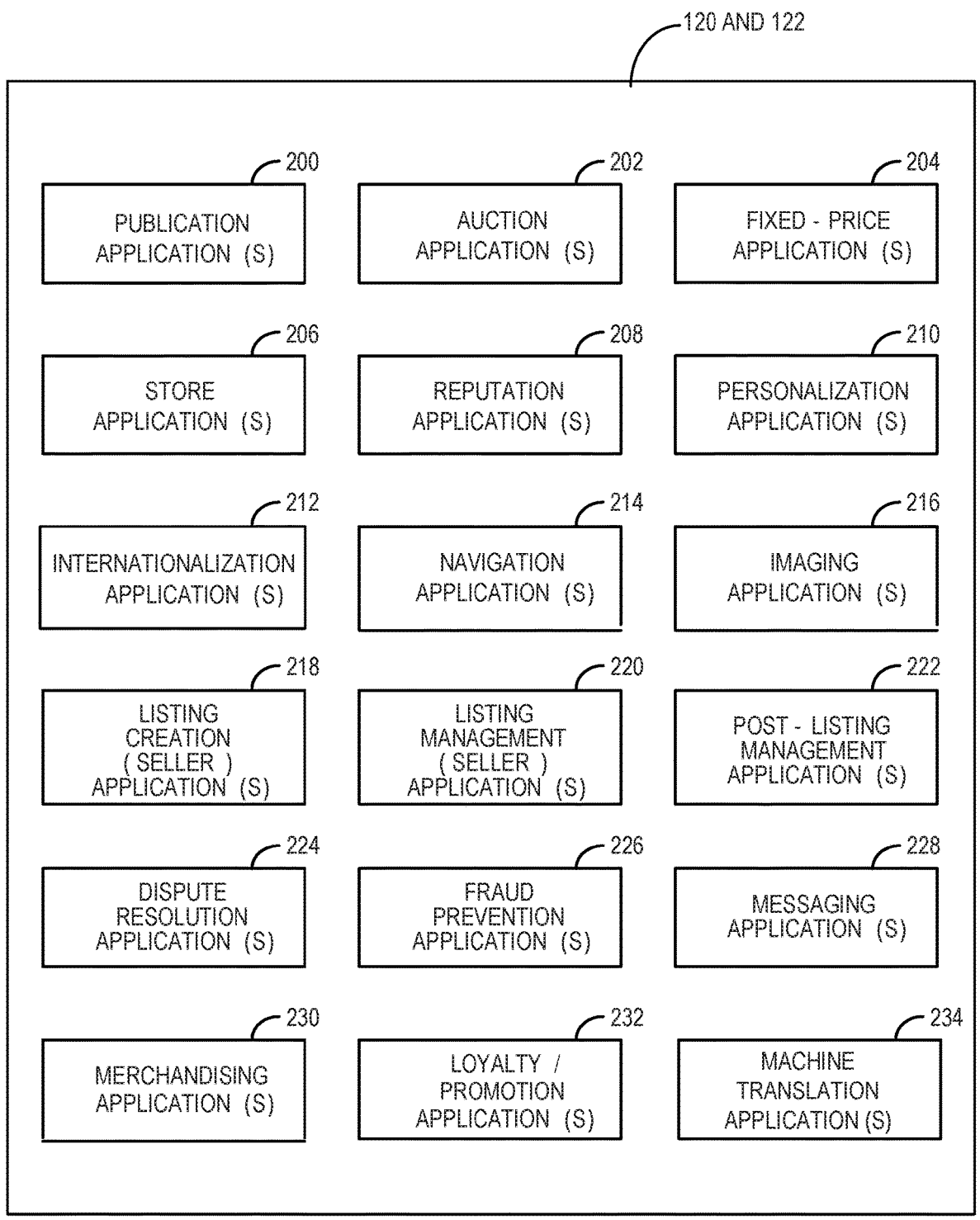
FIG. 2 is a block diagram illustrating marketplace and payment applications and that, in one example embodiment, are provided as part of application server(s) in the networked system.

FIG. 2 is a block diagram illustrating marketplace and payment applications 120 and 122 that, in one example embodiment, are provided as part of application server(s) 118 in the networked system 102. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may furthermore access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions, etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example, through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may accordingly include a number of internationalization applications 212 that customize information (and/or the presentation of information by the networked system 102) according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make listings available via the networked system 102 as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102 (such as, for example, messages advising users regarding the status of listings at the networked system 102 (e.g., providing "outbid" notices to bidders during an auction process or to provide promotional and merchandising information to users)). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular, WiFi, WiMAX) networks 104.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

A machine translation application 234 may develop parallel corpora from metadata of items such as ecommerce system listings. This parallel corpora may be developed from item metadata, for example one or more of item identifier, item title, Universal Product Code (UPC) or European Article Code (EAN) aspect name, UPC or EAN aspect value (i.e. a barcode), International Standard Book Number (ISBN), if applicable, category id, site id, seller id, picture of the item (photo) or an auction end date. A more detailed view of a machine translation application, or module, in accordance with an embodiment is seen in FIG. 2A.

Figure 2A:
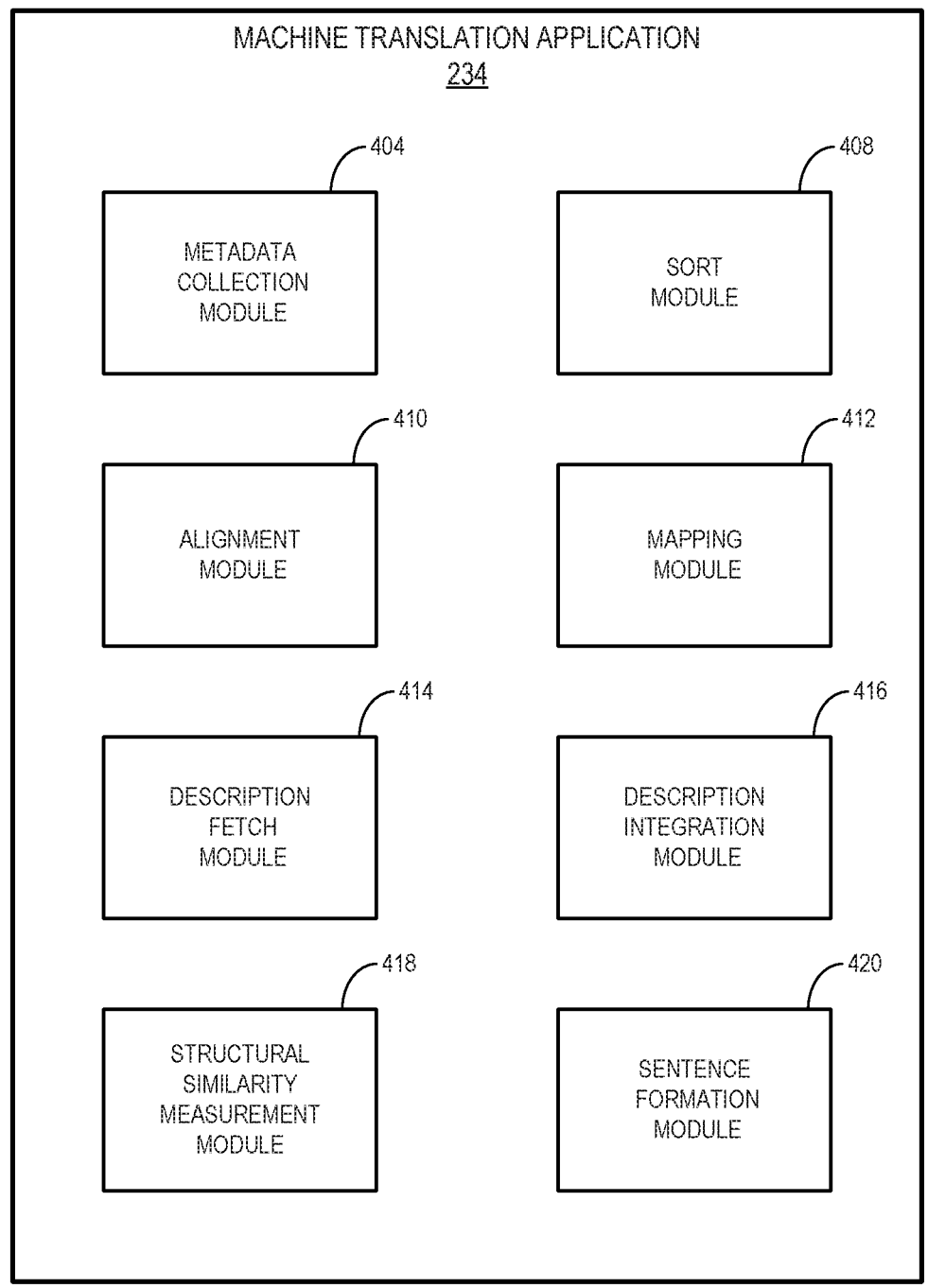
FIG. 2A is a block diagram illustrating an example machine translation application.

Machine translation module 234 is seen in additional detail in FIG. 2A. The machine translation module may comprise metadata collection module 404, sort module 408, alignment module 410, mapping module 412, description fetch module 414, description integration module 416, structural similarity module 418, and sentence formation module 420. An example detailed explanation of the operation of these modules is seen with respect to FIG. 4. Generally, and for clarification purposes, a machine translation system comprises considerably more than a single module to generate parallel training data. Once parallel data are collected, a sequence of steps is carried out by a machine translation system to produce a statistical translation model. The model is then applied to new sentences, not part of the parallel training data, to translate them.

An ecommerce listing may be any offer for sale of a product or service on an ecommerce web site or through an ecommerce service. This may include, for example, an auction listing, or a "buy it now" listing, but also could include a more traditional product sale page such as a web page devoted to a product sold by a particular retailer through the retailer's web page or service.

Machine translation is a subfield of computational linguistics that investigates the use of software to translate text or speech from one natural language to another. Machine translation relies heavily on parallel corporate, for example, translated documents, but acquiring parallel corpora is a very time consuming and expensive, particularly domain specific corpora like ecommerce system data. As described briefly earlier, in an example embodiment, metadata information known to an ecommerce system may be used to improve the accuracy of machine translation of text related to an ecommerce listing, for example to obtain parallel data, or parallel corpora, in a plurality of languages. Because products and services offered for sale on ecommerce web sites are listed in multiple languages on multiple web sites (eBay, for example, has sites in the United States, Spain, France, and others). Using one or more properties of these products and services, for instance, its product code or its image allows the identification of these items and thereby obtain multiple descriptions of the items (e.g., title, item specifics, descriptions) in multiple languages to form parallel corpora.

As an example, a buyer from Spain may search for a listing in an ecommerce system. The buyer may construct a query for the search in Spanish, and the listing may be in English in the ecommerce system's servers. Then, the system may use the machine translation model to translate the Spanish query into English, search for the listing that is in English, and translate the English listing back to Spanish using the machine translation engine. While this is explained using two languages such as Spanish and English, any two languages may be used. In another embodiment it may be desirable to use more than two languages.

In one embodiment the ecommerce system may collect listing metadata from its data logs, which may be a data warehouse containing over a million queries, and listings responsive to the queries. Although listings on an ecommerce system are used as an example embodiment, those of ordinary skill in the art will recognize that in addition to listings, embodiments may also include using other data items besides listings. In one embodiment, items which have a barcode (UPC or EAN in their item specifics, also known as aspects) may be used. In one embodiment, for each item the system may collect:

item ID
item title
UPC or EAN aspect name
UPC or EAN aspect value (e.g. the barcode itself)
ISBN
category ID
site ID
seller ID
picture
auction end date The data may be collected month by month over an appropriate number of months and over appropriate sites of the ecommerce system. The resulting data may be sorted on the barcodes to speed up the next step. For example, sort could be on the barcode itself, such as the 13 digit UPC (or EAN) code. The items may be aligned using barcodes to map items from one country language to items with same barcodes to another country language. Examples of Spanish language items mapped to English language items is seen in FIG. 3. In the example of FIG. 3, the breakdown of the items in the first row may be viewed as:

Country code (Spain): 186
Item id: 221212239103
Title: Zapatillas Converse Ct Clean Cvo Ox Piel Gris Carbon Hombre Talla EU 46.5
Country code (UK): 3
Item id: 321095610465
Title: Converse Ct Clean Cvo Ox Leather Mens Shoes Charcoal Size 12"
Seller id: 15709
Barcode: 0022861486496

The description of these aligned items may be fetched and added to the aligned items if and as needed to fill out the items. The structural similarity of these aligned items may be measured for pairs of items with descriptions that are structurally similar. Items on an ecommerce system, for example listings on eBay, usually come with a description that may be free Hyper Text Meta Language (HTML) text where the seller can provide any information he or she sees fit to include. By using an item's barcode (or other appropriate metadata), the item titles and descriptions may be aligned. This step comprises measuring the similarity of the descriptions of the aligned items. In other words, although the bar codes are the same, there is no guarantee at this point that one item is the translation of the other. Structural similarity is used to assess whether or not these two items are likely to be translations of each other. If they have roughly the same HTML, it is likely they are translations of each other. The structural similarity may therefore be based on the HTML code of the description. By "structure" is meant the order and hierarchy of the HTML tags of the items. Any HTML document can be represented as a tree where each node is an HTML tag and children of a node are all the HTML tags declared within that tag. Hence, structural similarity can be viewed as approximate tree isomorphism. Two HTML documents are similar if their isomorphism is greater than an empirical threshold. For example, two HTML trees may be assessed similar if they have 92% (0.92) or their nodes (HTML tags) and edges (hierarchical relation) in common. Another way to understand structural similarity is to consider each item as a sentence. Two sentences from two different HTML documents are similar if the set of HTML tags defined from the sentence to the root of the tree are similar. And two HTML documents are similar if most of their sentences are similar.

The descriptions may then be formed into sentences, and a list of aligned sentences, from one country language to another country language, may be provided as the output of the process, according to an embodiment. The texts in FIG. 3, alluded to above, comprise item titles, according to an embodiment. Sentences may comprise two types, according to an embodiment. One type may be item titles. For example, in "Zapatillas Converse Ct Clean Cvo Ox Piel Gris Carbón Hombre Talla EU 46.5", "Gel Refrescante Antistax Piernas 125 ml×4 0," and "Papel Decoracion Pared Panel Madera Chocolate FD31055 15" in FIG. 3 are sentences, according to an embodiment. Another type of sentence is sentences from descriptions, according to an embodiment. The English content embedded within an HTML description can be broken into sentences (using punctuation and HTML tags), according to an embodiment. Respective sentences may then be used to translate from one language to another, according to an embodiment.

Figure 4:
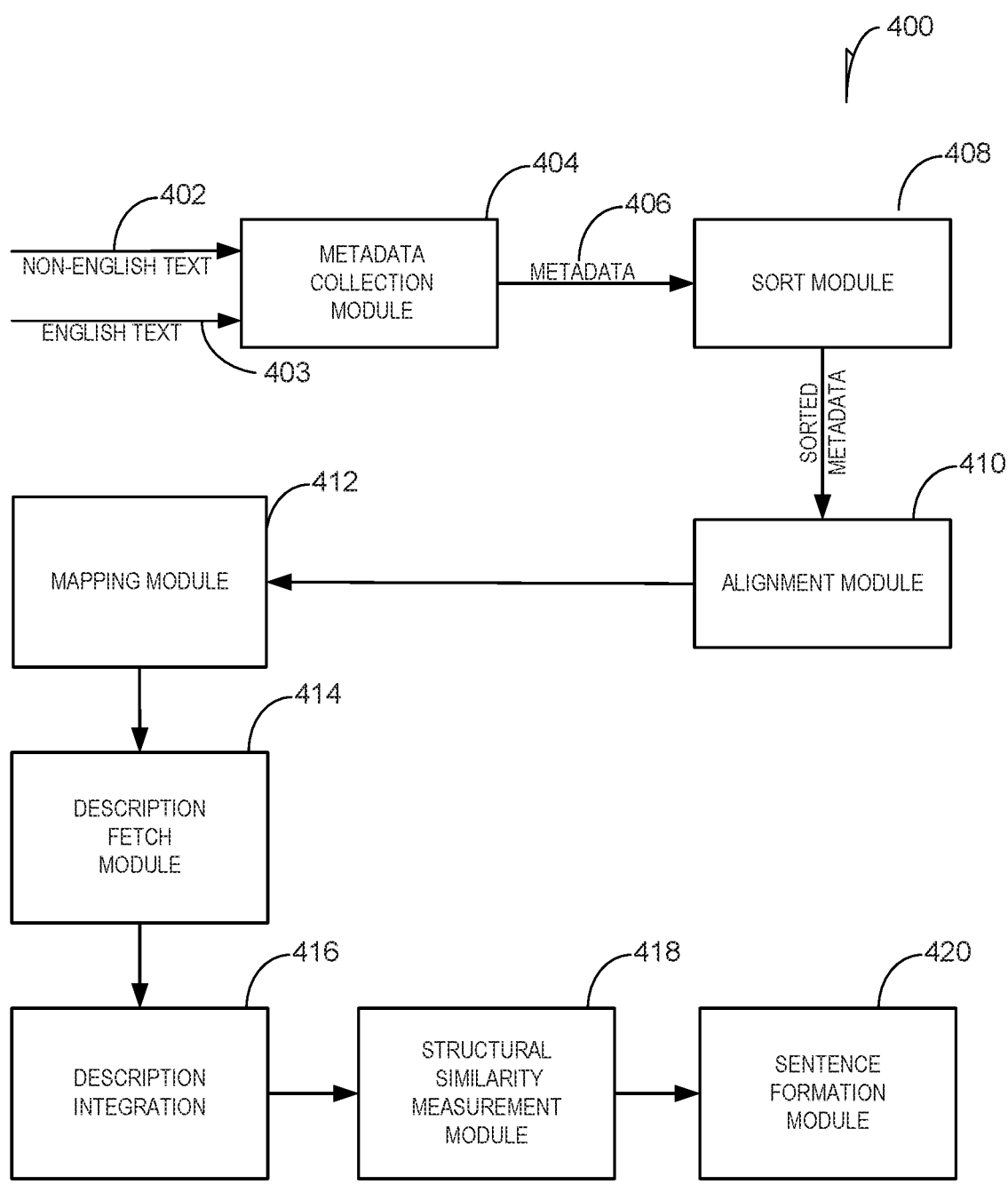
FIG. 4 is a block diagram illustrating a method of using metadata for language translation in accordance with an example embodiment.

FIG. 4 is a block diagram illustrating a method 400 of using metadata for language translation in accordance with an example embodiment. The method 400 depicts how non-English text 402 and English text 403 may be input to a metadata collection module 404 The input may be two sets of items, one for each site (for example a set of items in English, one set of items in Spanish). Please note that this can also be applied to other languages than English, for example French and German, among others. The metadata collection module 404 may be, in an example embodiment, an API to a web-based metadata collection module, although in some example embodiments a stand-alone metadata collection module 404 may be used. The metadata collection module 404 may act to collect item metadata from the non-English listings 402 and English listings 403 from data logs over an appropriate number of months as discussed above. The collected metadata 406, in one example with the items to which the metadata pertains, may then be passed to a sort module 408. The sort module 408 may sort the metadata. For example, the metadata may comprise bar codes of ecommerce system listings and the sorting may be done by metadata number in order to speed up the next step. In other words, the sort function is not necessarily a required step. The sorted metadata is sent to alignment module 410 which may align the listings using the metadata. For example, alignment module 410 may align the sorted bar codes from sort module 408. The output of alignment module 410 may be transmitted to mapping module 412. Mapping module 412 may be used to map the listings (items) from one country language to another country language as seen, in one embodiment, in FIG. 3. The mapped (aligned) listings may be sent to description fetch module 414 to be used, in one embodiment, as a query with which may fetch the descriptions of these aligned items, in one embodiment as HTML descriptions, and supply the descriptions to description integration module 416. In other embodiments, descriptions can be part of the input of 404. Description integration module may integrate (or add) the respective descriptions to the metadata-aligned items if and as needed to provide essentially complete aligned items. The mapped aligned items, with descriptions, may be provided to structural similarity measurement module 418, for measurement of the structural similarity of the mapped aligned items as discussed in greater detail above. For pairs of mapped items for which descriptions are structurally similar, the descriptions may be formed into sentences by sentence formation module 420. The results of sentence formation may be parallel corpora, a portion of which is seen in FIG. 3. The parallel corpora may be used to translate an item from one language to another language. Further, as alluded to above, the parallel corpora may be used to train a machine translation system.

Figure 5:
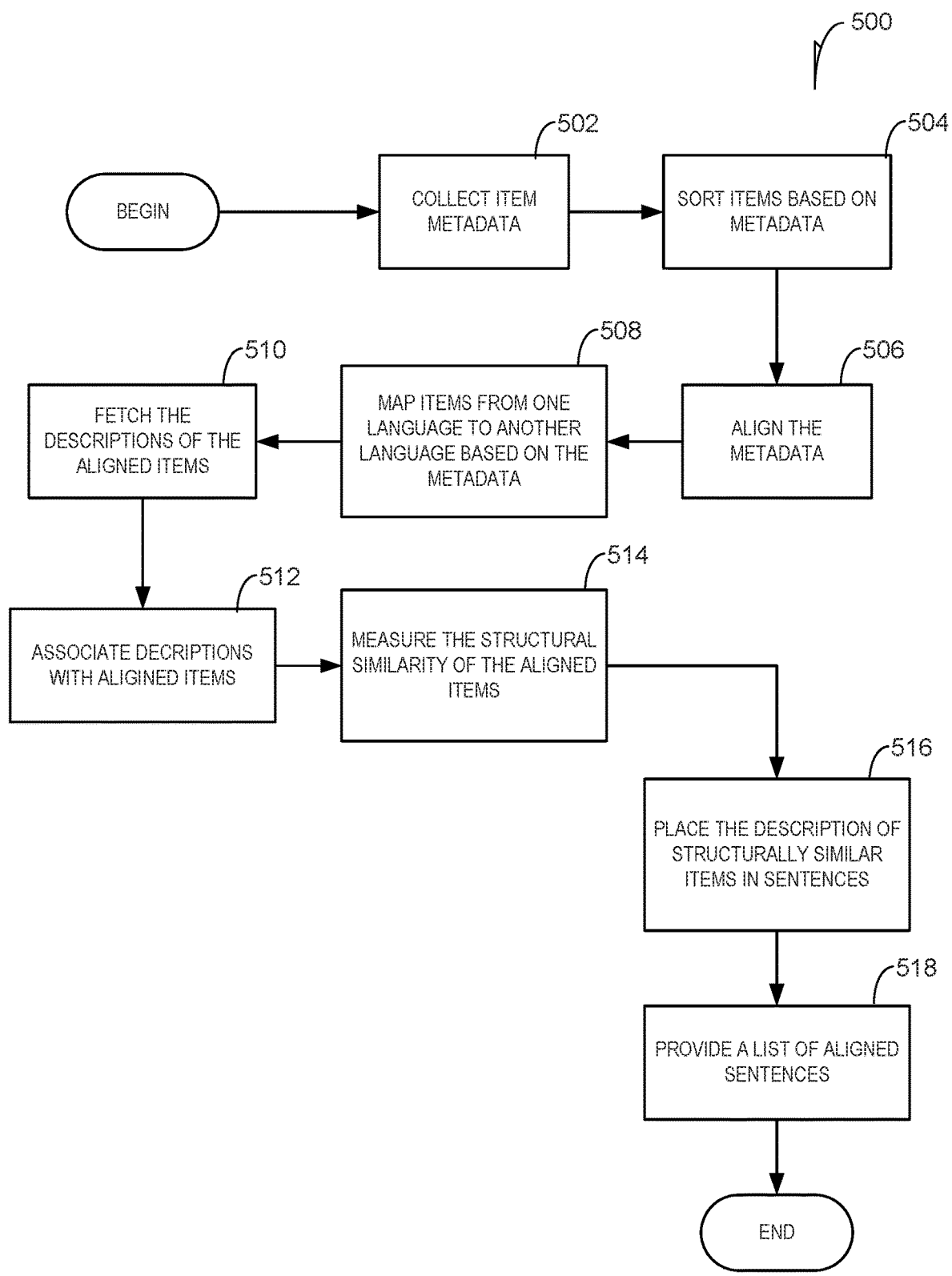
FIG. 5 is a flowchart illustrating an example method, consistent with various embodiments.

FIG. 5 is a flowchart illustrating an example method 500, consistent with various embodiments. As discussed previously, a buyer from Spain may search for a listing in an ecommerce system. The buyer may construct the query for the search in Spanish, and the listing may be in English in the ecommerce system's servers. Then, the system may the translation model to translate the Spanish query to English, search for the listing that is in English, and translate the English listing back to Spanish. While this is explained using two languages such as Spanish and English, any two languages may be used. In another embodiment it may be desirable to use more than two languages.

In the method 500 the ecommerce system may collect item (in one example ecommerce listing) metadata from ecommerce system data logs as at 502. The resulting metadata may be sorted, for example on the barcodes, as at 504. This sorting may be performed to speed up the next step. As one example, sort could be on the barcode itself, such as the 13 digit UPC (or EAN) code. The items may be aligned as at 506 by, in one embodiment, using barcodes. The aligned items may be used as at 508 to map items from one country language to items with same barcodes to another country language. The description of these aligned items, which may be HTML descriptions, may be fetched as at 510 and the descriptions may be associated with corresponding aligned items as at 512 if this has not previously been done. The structural similarity of these aligned items may be measured as at 514 for pairs of items with descriptions that are structurally similar. As discussed above, items, such as listing on an ecommerce system, usually come with a description that may be free HTML text where the seller can provide any information he or she sees fit to include. By aligning items using an item's barcode (or other appropriate metadata), the item titles and descriptions may be aligned. This step comprises measuring the similarity of the descriptions of the aligned items. In other words, although the bar codes are the same, there is no guarantee at this point that one item is the translation of the other. Structural similarity is used to assess whether or not these two items are likely to be translations of each other. If they have roughly the same HTML, it is likely they are translations of each other. The structural similarity is based on the HTML code of the description. By structure is meant the order and hierarchy of the HTML tags of the items. Any HTML document can be represented as a tree where each node is an HTML tag and children of a node are all the HTML tags declared within that tag. Hence, structural similarity can be viewed as approximate tree isomorphism. Two HTML documents may be said to be similar if their isomorphism is greater than an empirical threshold. Another way to understand structural similarity is to consider each as sentences. Two sentences from two different HTML documents are similar if the set of HTML tags defined from the sentence to the root of the tree are similar. And two HTML documents are similar if most of their sentences are similar.

The descriptions may then be placed into sentences as at 516, and a list of aligned sentences, from one country language to another country language may be provided as at 518. The foregoing method may be used to develop parallel corpora that may then be used to translate from one language to another.

Example Mobile Device

Figure 6:
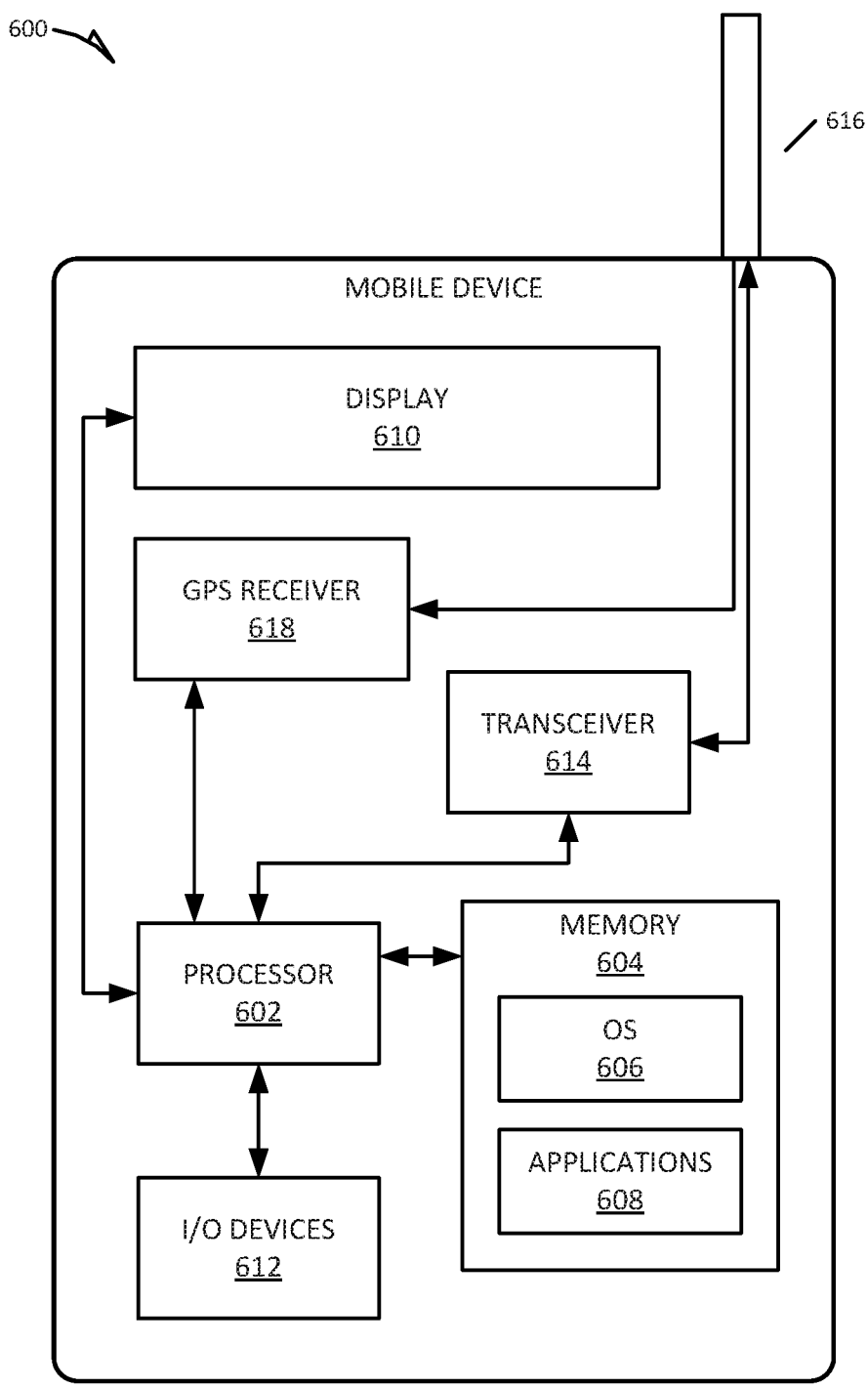
FIG. 6 is a block diagram illustrating a mobile device, according to an example embodiment.

FIG. 6 is a block diagram illustrating a mobile device 600, according to an example embodiment. The mobile device 600 may include a processor 602. The processor 602 may be any of a variety of different types of commercially available processors suitable for mobile devices (for example, an XScale architecture microprocessor, a microprocessor without interlocked pipeline stages (MIPS) architecture processor, or another type of processor 602). A memory 604, such as a random access memory (RAM), a flash memory, or other type of memory, is typically accessible to the processor 602. The memory 604 may be adapted to store an operating system (OS) 606, as well as application programs 608, such as a mobile location enabled application that may provide LBSs to a user. The processor 602 may be coupled, either directly or via appropriate intermediary hardware, to a display 610 and to one or more input/output (I/O) devices 612, such as a keypad, a touch panel sensor, a microphone, and the like. Similarly, in some embodiments, the processor 602 may be coupled to a transceiver 614 that interfaces with an antenna 616. The transceiver 614 may be configured to both transmit and receive cellular network signals, wireless data signals, or other types of signals via the antenna 616, depending on the nature of the mobile device 600. Further, in some configurations, a GPS receiver 618 may also make use of the antenna 616 to receive GPS signals.

Modules, Components and Logic

Certain embodiments are described herein as including logic or a number of components, modules, or mechanisms. Modules may constitute either software modules (e.g., code embodied (1) on machine-readable storage or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors 602 may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure processor 602, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors 602 that are temporarily configured (e.g., by software) or permanently configured to perform the relevant operations. Whether temporarily or permanently configured, such processors 602 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 602 or processor-implemented modules. The performance of certain of the operations may be distributed among the one or more processors 602, not only residing within a single machine, but deployed across a number of machines. In some example embodiments, the processor 602 or processors 602 may be located in a single location (e.g., within a home environment, an office environment or as a server farm), while in other embodiments the processors 602 may be distributed across a number of locations.

The one or more processors 602 may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 602, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors 602 executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 602), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
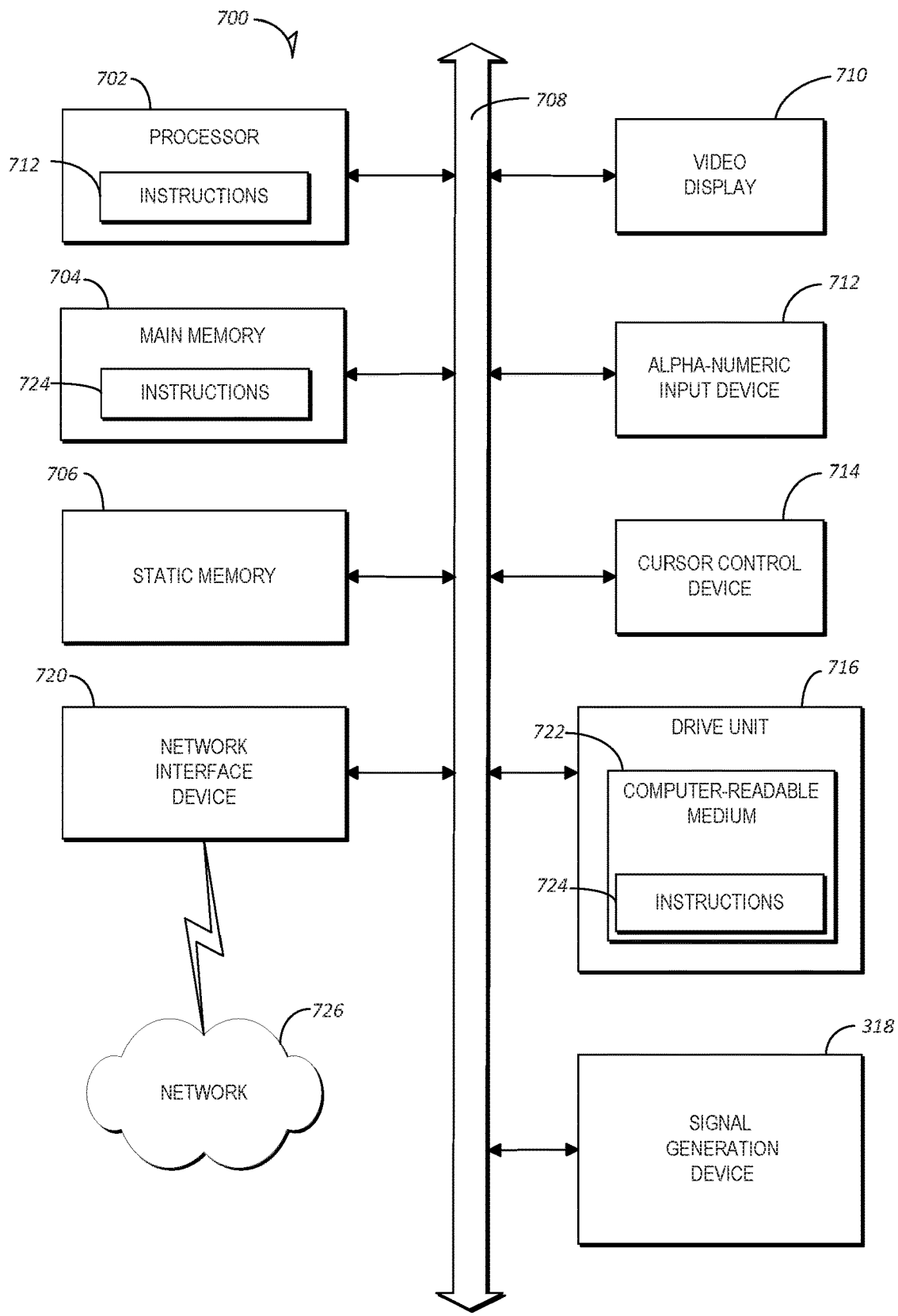
FIG. 7 is a block diagram of a machine in the example form of a computer system within which instructions may be executed for causing the machine to perform any one or more of the methodologies discussed herein.

FIG. 7 is a block diagram of machine in the example form of a computer system within which instructions 724 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard or a touch-sensitive display screen), a user interface (UI) navigation (e.g., cursor control) device 714 (e.g., a mouse), a disk drive unit 716, a signal generation device 718 (e.g., a speaker) and a network interface device 720.

Machine-Readable Medium

The disk drive unit 716 includes a computer-readable medium 722, which may be hardware storage, on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting computer-readable media 722.

While the computer-readable medium 722 is shown in an example embodiment to be a single medium, the term "computer-readable medium" may include a single medium or multiple media (e.g., a centralized or distributed database, and/or associated caches and servers) that store the one or more instructions 724 or data structures. The term "computer-readable medium" shall also be taken to include any tangible medium that is capable of storing, encoding or carrying instructions 724 for execution by the machine and that cause the machine to perform any one or more of the methodologies of the present disclosure or that is capable of storing, encoding or carrying data structures utilized by or associated with such instructions 724. The term "computer-readable medium" shall accordingly be taken to include, but not be limited to, solid-state memories, and optical and magnetic media. Specific examples of computer-readable media 722 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions 724 for execution by the machine, and includes digital or analog communications signals or other intangible media to facilitate communication of such software.

Although the inventive subject matter has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer implemented method comprising:
obtaining a first item listing that is posted by a first seller in a first language and that is related to selling a particular item that is a product, a service, or a combination of a product and service;
obtaining a second item listing that is posted by a second seller in a second language and that is also related to selling the particular item;
aligning the first item listing with the second item listing in response to the first item listing and the second item listing both being related to selling the same item;
identifying a first organizational structure with respect to first hierarchal relationships between first hypertext markup language (HTML) tags of first HTML code of a first description of the first item listing;
identifying a second organizational structure with respect to second hierarchal relationships between second HTML tags of second HTML code of a second description of the second item listing;
measuring, based on the aligning of the first item listing with the second item listing, an organizational structural similarity of the first HTML code with respect to the second HTML code by comparing the first organizational structure against the second organizational structure, the comparing including comparing the first hierarchal relationships against the second hierarchal relationships by comparing first nodes and first edges of a first tree that represents the first hierarchal relationships against second nodes and second edges of a second tree that represents the second hierarchal relationships; and
in response to the first HTML code and the second HTML code being determined as being organizationally structurally similar based on the measured organizational structural similarity, forming the first description into a first sentence in the first language as a translation of the second description into the first language.

2. The method of claim 1, further comprising forming the second description into a second sentence in the second language as a translation of the first description into the second language in response to the first HTML code and the second HTML code being organizationally structurally similar.

3. The method of claim 2, wherein the first sentence and the second sentence comprise parallel corpora and the method further comprises using the parallel corpora to translate another item listing from the first language to the second language.

4. The method of claim 2, wherein the first sentence and the second sentence comprise parallel corpora and the method further comprises using the parallel corpora to train a machine translation system.

5. The method of claim 1, wherein measuring the organizational structural similarity of the first HTML code with respect to the second HTML code includes measuring tree isomorphism of the first tree with respect to the second tree.

6. The method of claim 1, further comprising determining that the first HTML code and the second HTML code are organizationally structurally similar based on the organizational structural similarity meeting a similarity threshold.

7. The method of claim 1, further comprising:
collecting first metadata from the first item listing, the first metadata identifying the particular item; and
collecting second metadata from the second item listing, the second metadata identifying the particular item, wherein the aligning of the first item listing with the second item listing is in response to the first metadata and the second metadata both identifying the particular item.

8. A system comprising:
one or more processors;
a memory to store instructions that, in response to being executed by the one or more processors, cause the system to perform operations comprising:
obtaining a first item listing that is posted by a first seller in a first language and that is related to selling a particular item that is a product, a service, or a combination of a product and service;
obtaining a second item listing that is posted by a second seller in a second language and that is also related to selling the particular item;
aligning the first item listing with the second item listing in response to the first item listing and the second item listing both being related to selling the same item;
measuring, based on the aligning of the first item listing with the second item listing, an organizational structural similarity of first hypertext markup language (HTML) code of a first description of the first item listing with respect to second HTML code of a second description of the second item listing, the measuring of the organizational structural similarity including comparing first hierarchal connections between first HTML tags of the first HTML code against second hierarchal connections between second HTML tags of the second HTML code;
in response to the first HTML code and the second HTML code being determined as being organizationally structurally similar based on the measured organizational structural similarity, forming the first description into a first sentence in the first language and forming the second description into a second sentence in the second language in which the first sentence and the second sentence are parallel corpora; and
using the parallel corpora to perform one or more operations selected from a group of operations consisting of: translating another item listing from the first language to the second language; and training a machine translation system.

9. The system of claim 8, wherein the operations further comprise:
using the first sentence as a translation of the second description into the first language; and
using the second sentence as a translation of the first description into the second language.

10. The system of claim 8, wherein comparing the first hierarchal connections against the second hierarchal connections includes measuring similarity of first nodes and first edges of a first tree that represents the first HTML code with respect to second nodes and second edges of a second tree that represents the second HTML code.

11. The system of claim 8, wherein measuring the organizational structural similarity of the first HTML code with respect to the second HTML code includes measuring tree isomorphism of the first HTML code with respect to the second HTML code.

12. The system of claim 8, wherein the operations further comprise determining that the first HTML code and the second HTML code are organizationally structurally similar based on the organizational structural similarity meeting a similarity threshold.

13. The system of claim 8, wherein the operations further comprise:
collecting first metadata from the first item listing, the first metadata identifying the particular item; and
collecting second metadata from the second item listing, the second metadata identifying the particular item, wherein the aligning of the first item listing with the second item listing is in response to the first metadata and the second metadata both identifying the particular item.

14. The system of claim 8, wherein the operations further comprise:
identifying the first hierarchal connections between the first HTML tags; and
identifying the second hierarchal relationships between the second HTML tags.

15. One or more non-transitory computer-readable media embodying instructions that, in response to being executed by one or more processors of a system, cause the system to perform operations comprising:
obtaining a first item listing that is posted by a first seller in a first language and that is related to selling a particular item that is a product, a service, or a combination of a product and service;
obtaining a second item listing that is posted by a second seller in a second language and that is also related to selling the particular item;
measuring an organizational structural similarity of first hypertext markup language (HTML) code of a first description of the first item listing with respect to second HTML code of a second description of the second item listing in response to the first item listing and the second item listing both being related to selling the same item, the measuring of the organizational structural similarity including comparing first nodes and first edges of a first tree that represents the first HTML code against second nodes and second edges of a second tree that represents the second HTML code; and
in response to the first HTML code and the second HTML code being determined as being organizationally structurally similar based on the measured organizational structural similarity, forming the first description into a first sentence in the first language as a translation of the second description into the first language.

16. The one or more computer-readable media of claim 15, wherein the operations further comprise forming the second description into a second sentence in the second language as a translation of the first description into the second language in response to the first description and the second description being organizationally structurally similar.

17. The one or more computer-readable media of claim 16, wherein the first sentence and the second sentence comprise parallel corpora and the operations further comprise using the parallel corpora to perform one or more operations selected from a group of operations consisting of:

translating another item listing from the first language to the second language; and training a machine translation system.

18. The one or more computer-readable media of claim 15, wherein measuring the organizational structural similarity of the first HTML code with respect to the second HTML code includes measuring tree isomorphism of the first tree with respect to the second tree.

19. The one or more computer-readable media of claim 15, wherein the operations further comprise determining that the first HTML code and the second HTML code are organizationally structurally similar based on the organizational structural similarity meeting a similarity threshold.

20. The one or more computer-readable media of claim 15, wherein the operations further comprise:
 collecting first metadata from the first item listing, the first metadata identifying the particular item; and
 collecting second metadata from the second item listing, the second metadata identifying the particular item, wherein the measuring of the organizational structural similarity is in response to the first metadata and the second metadata both identifying the particular item.

* * * * *